United States Patent
Castey Dominguez

(10) Patent No.: US 7,319,211 B2
(45) Date of Patent: Jan. 15, 2008

(54) COOKING UTENSIL WITH BOTTOM WALL ADAPTED FOR INDUCTION HEATING

(76) Inventor: Ramon Castey Dominguez, Torra Malla, 20, 17003 Girona (ES)

( * ) Notice: Subject to any disclaimer, the term of this patent is extended or adjusted under 35 U.S.C. 154(b) by 0 days.

(21) Appl. No.: 10/527,658

(22) PCT Filed: Sep. 11, 2003

(86) PCT No.: PCT/ES03/00459

§ 371 (c)(1),
(2), (4) Date: Aug. 16, 2005

(87) PCT Pub. No.: WO2004/023951

PCT Pub. Date: Mar. 25, 2004

(65) Prior Publication Data

US 2006/0096467 A1    May 11, 2006

(30) Foreign Application Priority Data

Sep. 12, 2002 (ES) .......................... 200202247 U

(51) Int. Cl.
*H05B 6/12* (2006.01)
(52) U.S. Cl. ..................... 219/621; 220/573.3
(58) Field of Classification Search ............. 219/621, 219/622, 624, 626, 635, 662, 672, 627, 667; 220/573.1, 573.3, 574; 99/403, 348, 330; 126/299 R, 211
See application file for complete search history.

(56) References Cited

U.S. PATENT DOCUMENTS 4,544,818 A    10/1985    Minamida 6,702,140 B1 *    3/2004    Sollo ................. 220/573.3

FOREIGN PATENT DOCUMENTS

| DE | 37 13 660 A1 | 11/1988 |
|---|---|---|
| DE | 100 33 057 A1 | 5/2001 |
| EP | 0 648 458 A1 | 4/1995 |
| EP | 0 722 688 A1 | 7/1996 |
| ES | 269304 | 6/1983 |
| ES | 2 002 980 | 10/1988 |
| ES | 2 108 284 | 12/1997 |
| ES | 2 135 632 | 11/1999 |
| FR | 2 739 998 | 4/1997 |
| JP | 06215862 A * | 8/1994 |
| JP | 2003061819 A * | 3/2003 |
| JP | 2003-102616 | 4/2003 |
| WO | WO 97/09136 | 3/1997 |

OTHER PUBLICATIONS

International Search Report for International PCT Application No. PCT/ES03/00459, mailed Nov. 12, 2003.

* cited by examiner

*Primary Examiner*—Quang Van
(74) *Attorney, Agent, or Firm*—RatnerPrestia

(57) ABSTRACT

A cooking utensil with bottom wall adapted for induction heating, is provided. The cooking utensil includes a container made from a first material that has attached to the outside of its bottom wall a heat distributing plate made from a second, different, heat conducting material, the outer surface having a series of spaced projections with the heat distributing plate being made up of a disc produced from ferromagnetic material provided with a number of perforations equivalent to the number of projections and appropriately distributed to allow the engagement of the disc, backed onto the bottom wall, by inserting the projections through the perforations, leaving the disc joined to the bottom wall by riveting the projections.

18 Claims, 3 Drawing Sheets

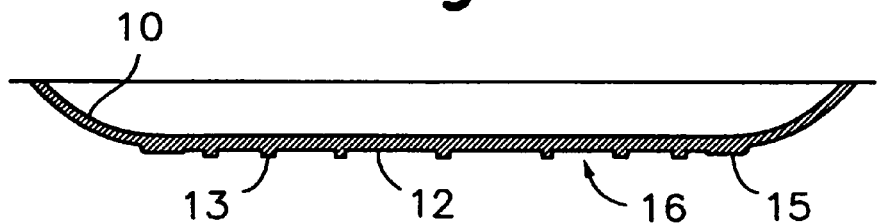
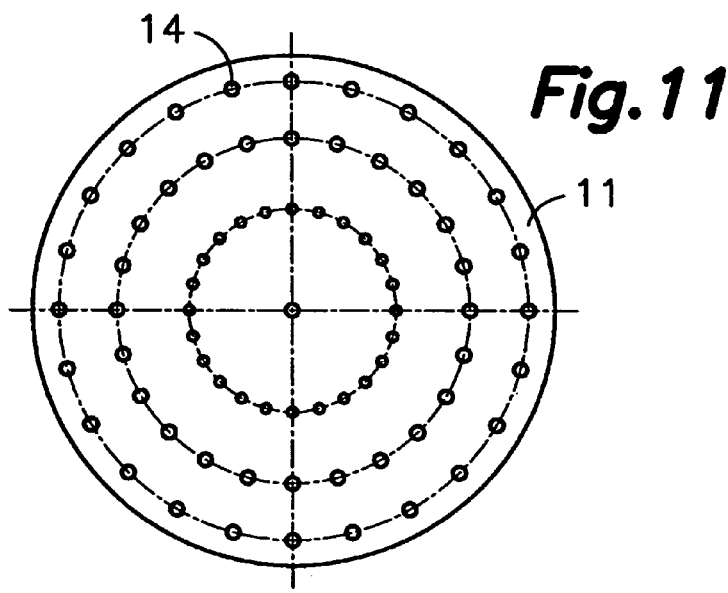
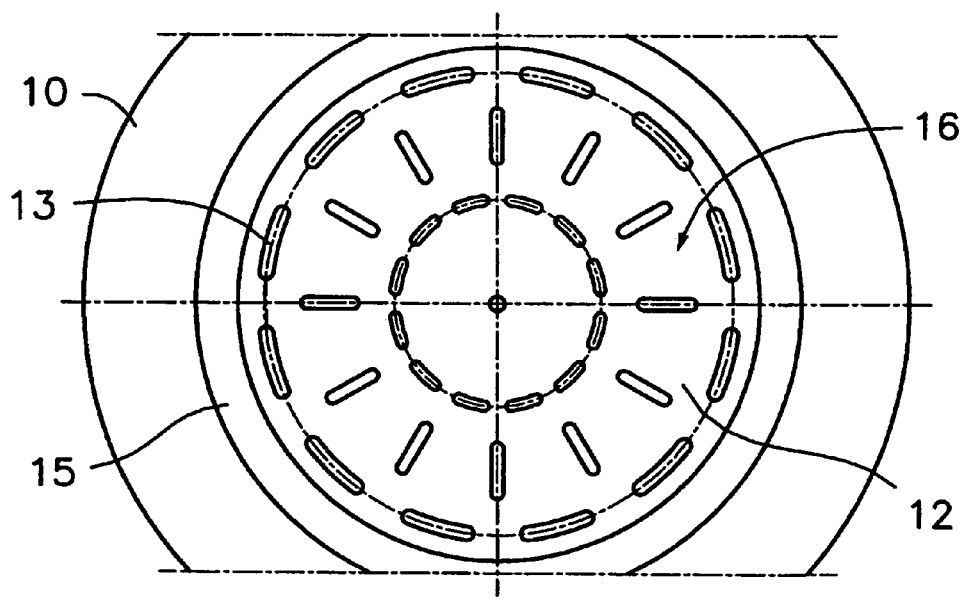

COOKING UTENSIL WITH BOTTOM WALL ADAPTED FOR INDUCTION HEATING

This application is a U.S. National Phase Application of PCT International Application No. PCT/ES2003/000459 filed Sep. 11, 2003.

FIELD OF THE INVENTION

This invention relates to a cooking utensil, particularly a cooking container such as a saucepan, pan or pot, with a bottom wall adapted for an induction cooker.

BACKGROUND

It is known that although metallic containers, such as those obtained for example by aluminium injection casting technology, maintain their functional nature for different types of heat transmission and are particularly suitable for electric, gas or glass ceramic cookers where the heat for the container is produced respectively through direct contact with an electric resistance, with the flame produced by gas combustion or via a special glass ceramic surface, they are not suitable for induction cookers where the heat for the utensil is produced by taking advantage of the phenomenon of magnetic induction, where a magnetic field of variable intensity heats ferric materials that are within its reach.

Therefore it is necessary to either manufacture the whole utensil in a ferromagnetic material with the disadvantages and limitations this involves (cost, weight and handling, heat resistance and durability, etc.), or attach to the bottom wall of the utensil, at least one plate of ferromagnetic material capable of absorbing an efficient yield of calorific energy produced by electromagnetic induction because the so-called losses through hysteresis are transformed into calorific energy.

Different solutions are known in the art, which aim at integrating a ferromagnetic plate underneath the bottom wall of a cooking container made from a different material, for example, an austenitic steel or aluminium.

In this sense the following patents can be quoted. Patent ES-A-2002980 proposes a cooking container on the bottom wall of which an intermediate heat diffusing metal plate is attached and underneath said plate a ferromagnetic stainless steel lining, with the elements being welded together. Patent ES-A-2108284 describes a culinary utensil with a heat conducting bottom wall having a perforated metallic sheet attached to the outer face of said bottom wall during casting, using the flow of metal to fill said perforations. Patent ES-A-2135632 proposes a cooking utensil with a metallic plate or strip that has openings which receive filler parts made from a ferromagnetic material, the ensemble being joined together by a weld bead applied with a laser beam to the bottom wall of a container made from austenitic steel. Patent application DE-A-3713660 describes a cooking utensil made from cast-moulded aluminium, preferably a saucepan, that includes at least one solid metallic part attached to the outer part of its bottom wall in the cast-moulding process with the aluminium. Patent application EP-A-722688 describes a culinary utensil with a part attached by a high temperature pressure to the outer face of its bottom wall. Patent application WO-A-97/09136 describes a method for manufacturing a piece of metal intended to constitute the bottom wall of a cooking utensil, obtained by roll forging, plastically deforming the metal, and in which manufacturing process, one variant thereof envisages the inclusion of some metal parts that can be induction heated integrated with the metal part in the forging process.

SUMMARY OF THE INVENTION

In relation to the afore-mentioned prior art, the present invention provides an embodiment which achieves a very firm and stable joint against the dilatations and/or deformations that appear, at the bottom wall level, between a ferromagnetic plate and the bottom wall of an aluminium cooking utensil on whose outer face the former is attached. In particular and by providing a simple union consisting of only said ferromagnetic plate and said bottom wall, there is a reduction in the damaging effects caused by the heat from the most widely used heating means in the event that said bottom wall comprises various layers of materials of different composition, as in most of the afore-mentioned prior art. With respect to the joining systems used in the actual casting process, the constitution of the utensil herein proposed represents an important simplification of the manufacturing means and, therefore, a significant saving in costs.

According to an exemplary embodiment of the present invention, the proposed cooking utensil is of the type that comprises a container made from a first material that has integrated on its bottom wall and on its outer face, a heat distributing or diffusing plate made from a second, different, heat conducting material, said outer face of the bottom wall of the container having a series of projections (of different shapes) or lugs advantageously placed equidistantly with said heat distributing plate being made up of a disc produced from a ferromagnetic material and having a number of perforations or holes equivalent to the number of projections or lugs and distributed appropriately to allow the engagement of said disc, backed onto said bottom wall, by means of the correspondence and insertion of said projections with and through said holes, leaving the disc joined to the bottom wall by riveting said projections, subsequently polishing the outer surface of the disc or the utensil support base.

In a preferred embodiment of the invention the container is to be made from aluminium obtained via an injection casting process.

Said disc will be preferably a sheet of stainless steel so that a light, manageable cooking utensil is obtained, suitable for all kinds of heat sources, particularly, an induction cooker.

According to an example of how the invention is implemented, once said stainless steel disc is fitted into the holes a pressing operation is performed, acting on one side on the bottom wall and on the other on the visible face of the disc, with a pressure of considerable magnitude according to the type of utensil and, for example, of the order of about an 80 to 110 Tn load whereby the aluminium material of the projections or lugs expands and is completely imprisoned in and on the disc material, acting as riveting. In this way, a very efficient joint is achieved between the aluminium element (container) and the heat diffusing ferromagnetic element, which is suitable for cooperating with induction-produced energy and is very stable against heat dilatations in view of the deformation imposed by the aluminium material on the walls of the through holes of the ferromagnetic disc and the deformation proper of the lugs, which widens their section thus allowing said thermal dilatations generated through usage to be subsequently absorbed.

The polishing of the outer face of said disc acting as diffuser provides a suitable finish to the utensil support surface.

In a preferred embodiment of the invention it is envisaged that the container includes an annular partition which surrounds the outer surface of its bottom wall plane defining a flattened housing suitable for receiving said fitted ferromagnetic heat receiving and diffusing disc, the height of the partition being slightly lower than that of said projections or lugs and leaving the ferromagnetic disc, once attached through pressing and once the lugs are inserted in the holes and riveted, substantially coplanar to the edge of said partition.

The design and positioning of said projections or lugs is such that it allows the two parts, that is, the bottom wall of the aluminium container and stainless steel disc to remain joined together without play although very high temperatures are reached and in spite of the fact that the aluminium and steel dilate differently.

BRIEF DESCRIPTION OF THE DRAWINGS

Other characteristics and advantages of the invention will become clear after reading the examples for implementing the invention which are described below with reference to the sheets of drawings, in which:

FIGS. 10 and 11 show another cooking utensil and heating energy receiver and diffuser disc ensemble, both with a different number of lugs and perforations, in the situation prior to joining both elements.

FIG. 12 illustrates an example of a projection shaped and distributed differently to the lugs illustrated in previous figures.

DETAILED DESCRIPTION OF THE INVENTION

Figure 1:
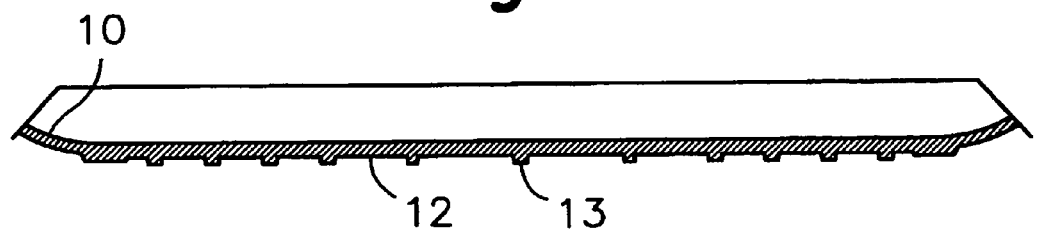
FIG. 1 is an elevation view, partially in section, of the bottom wall of a cooking utensil according to the invention, before a ferromagnetic heat diffusing plate or disc is attached thereto, with the presence of a series of projections being noticeable, in this case in the form of lugs on the outer plane of the bottom wall of the utensil.
Figure 2:
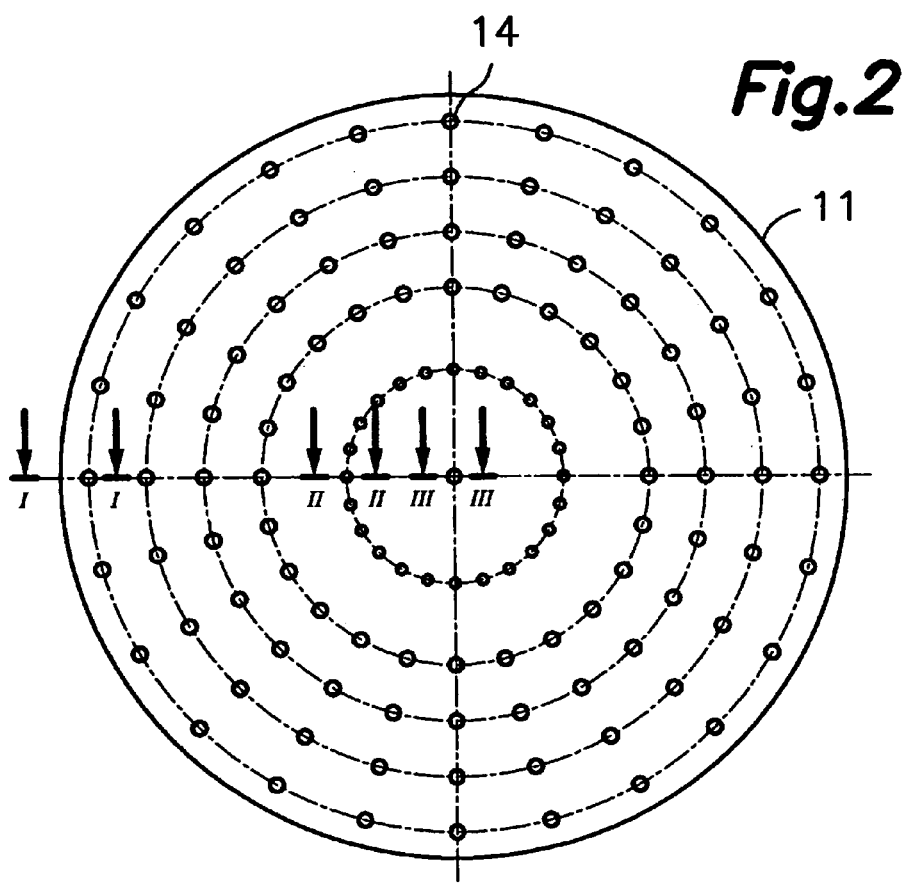
FIG. 2 is a plan view of said diffuser disc.

According to these figures, the proposed cooking utensil comprises a container 10, such as a saucepan, pan, pot or the like, made from a first material such as aluminium which provides manageability and a light weight, said container having integrated on the outer face of its bottom wall a heat distributing or diffusing plate, made up of a stainless steel disc 11 or strip. According to the invention, the outer surface 12 of the bottom wall of the container 10 has a series of distanced projections or lugs 13 and said stainless steel disc 11 has a series of perforations 14 equivalent to the number of lugs 13 appropriately distributed to allow the engagement of said disc 11 backed onto the outer face of said bottom wall, by inserting the lugs 13 through the holes 14, leaving the disc 11 joined to the bottom wall by riveting the lugs 13 with a pressing operation that acts on one side on the bottom wall of the container 10 and on the other side on the disc 11, and then applying a polishing or grinding operation to the outer surface of the disc 11 which will form the utensil support base.

The said pressing operation shall be carried out advantageously using a hydraulic press provided with a suitable set of handling elements for positioning, attaching and riveting the bottom wall and disc ensemble automatically, such as a transfer machine which is not shown, having positioning stations for both elements, that is, the bottom wall of the utensil and the disc joined together, a station for checking the position of the diffuser disc, a hydraulic riveting station and an automatic discharge station.

Figure 6:
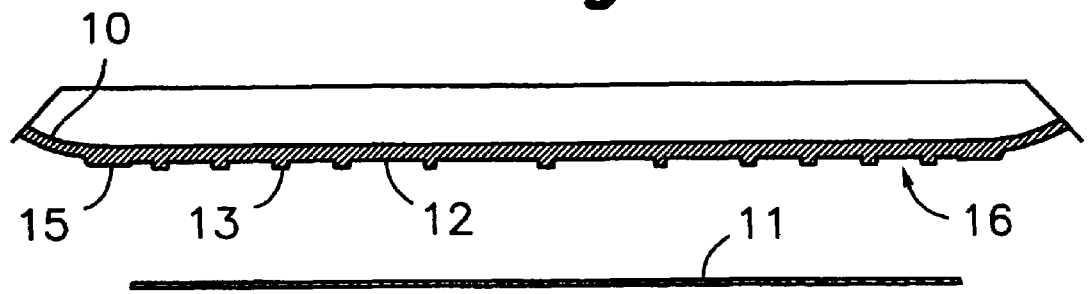
FIGS. 6 and 7 illustrate the situation prior to mounting the diffuser disc and the situation after attaching it to the said bottom wall.
Figure 7:
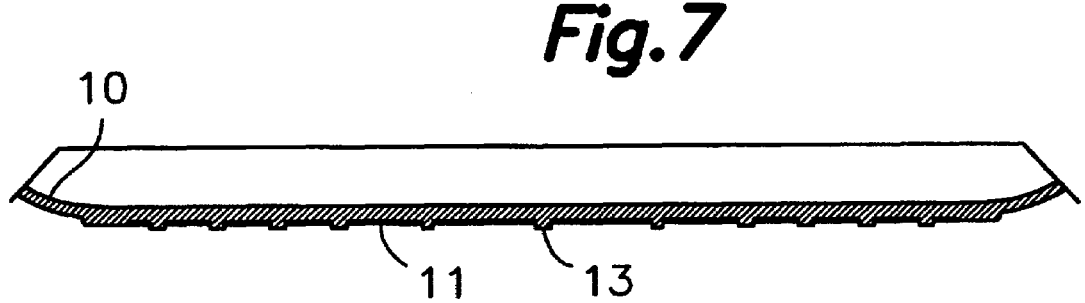
Figure 8:
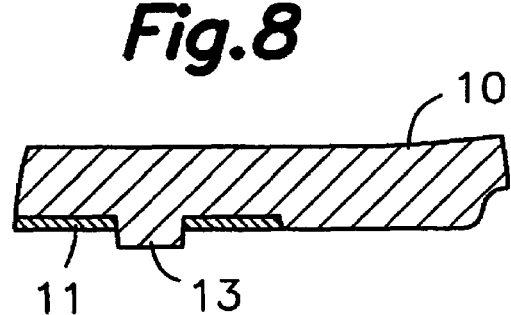
FIG. 8 is an enlarged detail of the diffuser disc adopts before the riveting operation using a suitable pressing machine.
Figure 9:
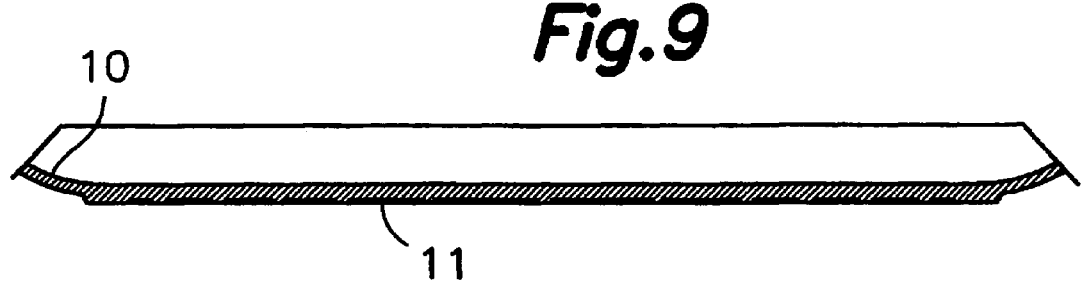
FIG. 9 illustrates the final situation following the pressing and polishing operation which provides a riveted join between the two elements, container and disc, and a flat, regular finish to the utensil support plane.

In FIG. 6 it can be seen that the bottom wall of the container 10 has an annular partition 15 which surrounds the outer surface of its bottom plane defining an open, flattened housing 16, suitable for receiving said fitted diffuser disc 11, the height of said partition 15 being slightly lower than that of said lugs 13 so that the disc 11, once it is attached and the lugs 13 are inserted into the holes 14, is coplanar to the edge of said partition 15 as can be seen in FIG. 9.

Figure 3:
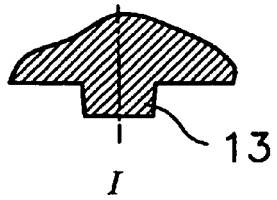
FIGS. 3, 4 and 5 are respective sections along the lines I-I, II-II and III-III of various lugs on the bottom wall shown in FIG. 1.
Figure 4:
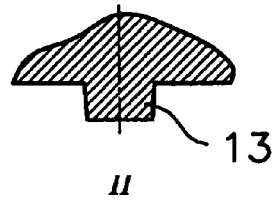
Figure 5:
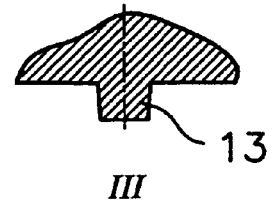

In a preferred embodiment of the invention and as can be seen in FIGS. 3 and 5 said lugs have a frustoconical shape and they are distributed according to various concentric circumferential alignments. Generally, the lugs 13 belonging to different alignments will have a different thickness and likewise the holes 14 provided for their passage through the disc 11 will be adequately sized. In this way, the material stress arising from the thermal dilatations are different in different areas, thereby improving stability.

FIG. 12 illustrates another shape and distribution format for the projections 13.

According to a preferred way of implementing this model the container 10 is to be made from aluminium obtained by injection casting and said diffuser disc 11 backed onto the outer surface of its bottom wall is made from stainless steel.

Having described this invention sufficiently for it to be put into practice by a person skilled in the art, it is requested that its scope of protection be extended to those amendments to detail such as the thickness of the ferromagnetic disc, the shape of the projections or lugs and their distribution, the height of the peripheral partition, the pressing strength, the material used and the characteristics of the presses used, which do not alter the essence of the invention described in the following claims.

The invention claimed is:

1. A cooking utensil with a bottom wall adapted for induction heating of the type comprising:
    a container made from a first material, that has integrated on the outer face of its bottom wall a heat distributing or diffusing plate made from a second, different, heat conducting material, the outer surface of the bottom wall of the container having a series of spaced projections and said heat distributing plate comprises a disc made from a ferromagnetic material provided with a number of perforations equivalent to the number of projections or lugs and appropriately distributed to allow the engagement of said disc, backed onto said bottom wall, by inserting the lugs through the perforations, leaving the disc attached to the bottom wall by riveting said projections; and
    an annular partition which surrounds said outer surface of its bottom wall plane defining an open, flattened housing suitable for receiving said fitted disc, the height of the partition being slightly lower than that of said lugs and leaving the disc, once it is attached and the lugs are inserted into the holes and riveted, coplanar to the edge of said partition.

2. The cooking utensil according to claim 1, wherein said projections comprise frustoconical lugs.

3. The cooking utensil according to claim 2, wherein said lugs are distributed according to various concentric circumferential alignments, with at least the lugs belonging to two of said alignments having a different thickness.

4. The cooking utensil according to claim 3, wherein said container is made from aluminium obtained from injection casting and said disc backed onto the outer surface of its bottom wall is made from stainless steel.

5. The cooking utensil according to claim 4, wherein said container forms a saucepan.

6. The cooking utensil according to claim 5, wherein said container forms a pot.

7. The cooking utensil according to claim 2, wherein said container is made from aluminium obtained from injection casting and said disc backed onto the outer surface of its bottom wall is made from stainless steel.

8. The cooking utensil according to claim 7, wherein said container forms a saucepan.

9. The cooking utensil according to claim 8, wherein said container forms a pot.

10. The cooking utensil according to claim 1 wherein said container is made from aluminium obtained from injection casting and said disc backed onto the outer surface of its bottom wall is made from stainless steel.

11. The cooking utensil according to claim 10, wherein said container forms a saucepan.

12. The cooking utensil according to claim 11, wherein said container forms a pot.

13. The cooking utensil according to claim 1, further comprising a polished or grounded finish applied to the outer surface of the disc or utensil support base, once the plate or disc has been attached.

14. The cooking utensil according to claim 1, wherein said container is made from aluminium obtained from injection casting and said disc backed onto the outer surface of its bottom wall is made from stainless steel.

15. The cooking utensil according to claim 14, wherein said container forms a saucepan.

16. The cooking utensil according to claim 15, wherein said container forms a pot.

17. A cooking utensil with a bottom wall adapted for induction heating comprising: a container made from a first material, that has integrated on the outer face of its bottom wall, a heat distributing or diffusing plate made from a second, different, heat conducting material, wherein the outer surface of the bottom wall of the container has a series of spaced projections and said heat distributing plate is made up of a disc made from a ferromagnetic material provided with a number of through perforations equivalent to the number of projections and appropriately distributed to allow the engagement of said disc, backed onto said bottom wall, by inserting the lugs through the perforations, the disc remaining attached to the bottom wall by riveting of said projections, wherein the projections are comprised of lugs that are frustoconical before being riveted and that are deformed against the walls of the through perforations after being riveted, and the cooking utensil comprises a polished or ground finish applied to the outer surface of the cooking utensil support base once the heat distributing plate or disc has been attached to the container.

18. A method of making a cooking utensil for use with induction heating comprising:

providing a container formed from a first material and having a plurality of projections comprising frustoconical lugs extending from a surface of said container;

providing a diffusion plate formed from a second material different than said first material;

forming a plurality of through perforations in said diffusion plate;

receiving said plurality of projections into said plurality of through perforations;

coupling said container to said diffusion plate by deforming at least a portion of said plurality of projections against said diffusion plate and against the walls of the through perforations; and applying a polished or ground finish to the outer surface of the utensil support base once the plate or disc has been attached to the container.

* * * * *